United States Patent [19]

Shimizu

[11] Patent Number: 4,686,433
[45] Date of Patent: Aug. 11, 1987

[54] MOTOR-DRIVEN POWER BOOSTER

[75] Inventor: Yasuo Shimizu, Tochigi, Japan

[73] Assignee: Honda Giken Kogyo Kabushiki Kaisha, Tokyo, Japan

[21] Appl. No.: 794,012

[22] Filed: Nov. 1, 1985

[30] Foreign Application Priority Data

Nov. 2, 1984 [JP] Japan .................................. 59-231757

[51] Int. Cl.$^4$ ............................................ B62D 5/04
[52] U.S. Cl. ...................................... 318/50; 318/488; 318/489; 180/79; 74/388 PS
[58] Field of Search ................. 318/50, 432, 433, 488, 318/489, 2, 675; 180/6.28, 6.44, 6.5, 79.1, 79, 141, 142, 145; 74/388 R, 388 PS

[56] References Cited

U.S. PATENT DOCUMENTS

| Re. 23,550 | 9/1952 | Staude | 74/388 |
|---|---|---|---|
| 1,231,885 | 7/1917 | Heinze | 180/79.1 |
| 2,415,157 | 2/1947 | Bedford | 74/388 R |
| 2,417,287 | 3/1947 | Belo | 318/489 X |
| 2,535,667 | 12/1950 | Burger et al. | 318/432 |
| 2,604,613 | 7/1952 | Klass | 318/28 |
| 2,689,318 | 9/1954 | Goertz et al. | 318/488 X |
| 2,754,465 | 7/1956 | Brier | 180/79.1 X |
| 2,877,656 | 8/1954 | Orr | 74/388 |
| 3,188,540 | 4/1962 | Lautzenhiser | 318/23 |
| 3,191,109 | 6/1965 | Hepner | 318/2 |
| 3,511,104 | 4/1968 | Piat | 74/388 |
| 3,983,953 | 10/1976 | Bayle | 180/79.1 |
| 4,241,804 | 12/1980 | Deininger et al. | 180/79.1 |
| 4,250,765 | 2/1981 | Niklaus et al. | 74/388 PS |
| 4,260,918 | 4/1981 | Engle | 310/87 |
| 4,415,054 | 11/1983 | Drutchas | 180/79.1 |
| 4,437,531 | 3/1984 | Urabe | 180/79.1 |
| 4,448,275 | 5/1984 | Kitagawa et al. | 180/79.1 |
| 4,490,657 | 12/1984 | Smith | 318/432 X |
| 4,509,611 | 4/1985 | Kade et al. | 180/79.1 |
| 4,522,278 | 6/1985 | Kitagawa et al. | 180/79.1 |
| 4,530,413 | 7/1985 | Buike et al. | 180/79.1 |
| 4,538,698 | 9/1985 | Hashimoto et al. | 180/79.1 |

Primary Examiner—William M. Shoop, Jr.
Assistant Examiner—Bentsu Ro
Attorney, Agent, or Firm—Armstrong, Nikaido, Marmelstein & Kubovcik

[57] ABSTRACT

A motor-driven power booster suitable for use in a motor-driven power steering system. The power booster comprises a casing, input and output shafts rotatably supported on the casing, a first motor for driving the output shaft, a second motor for driving the input shaft, an angle detector operatively cooperating with the first and second shafts for generating an output signal dependent on angular positions of the input and output shafts, and an electric circuit for supplying electric power to the first motor to apply an output torque to the output shaft in response to the output signal from the angle detector and for supplying electric power to the second motor to apply a reactive torque to the input shaft in response to the electric power supplied to the first motor. Since the input and output shafts are mechanically uncoupled, desired output-torque vs. reactive-torque characteristics can easily be attained by the power booster.

7 Claims, 12 Drawing Figures

MOTOR-DRIVEN POWER BOOSTER

BACKGROUND OF THE INVENTION

The present invention relates to a motor-driven power booster, and more particularly to a motor-driven power booster suitable for use in an automotive motor-driven power steering system.

There are widely known power boosters including an input shaft, an output shaft, and an electric motor for driving the output shaft dependent on either the torque applied to the input shaft or the angular position of the input shaft. Particularly, those power boosters which are used in automotive power steering systems have a resilient member such as a torsion bar for operatively coupling the input and output shafts to each other. Such power steering systems are however disadvantageous in that any variation in the torque produced by the output shaft tends to be transmitted to the input shaft through the resilient member due to a small torque change arising from the automobile running over rough terrain, a torque change arising from the meshing engagement in a rack and pinion which may be employed for torque transmission from the motor to the linkage, the backlash of a speed reducer that may be used for torque transmission, and machining errors. Furthermore, it would not be easy to change the magnitude of the torque transmitted from the output shaft to the input shaft (reactive torque).

SUMMARY OF THE INVENTION

The present invention has been made in an effort to eliminate the aforesaid drawbacks of the conventional motor-driven power boosters.

It is an object of the present invention to provide a motor-driven power booster capable of preventing undesirable torque, variation from being transmitted from the output shaft to the input shaft and also of easily selecting and changing the reactive torque.

According to the present invention, a motor-driven power booster includes a casing, input and output shafts rotatably supported on the casing, a first motor for driving the output shaft, and a second motor for driving the input shaft. The power booster also includes detecting means operatively cooperating with the first and second shafts for generating an output signal dependent on angular positions of the input and output shafts, and electric circuit means for supplying electric power to the first motor to apply an output torque to the output shaft in response to the output signal from the angle detector and for supplying electric power to the second motor to apply a reactive torque to the input shaft in response to the electric power supplied to the first motor.

In the illustrated embodiment, the input and output shafts are arranged coaxially with each other, and the detecting means includes means for detecting the relative angular displacement of the input shaft with respect to the second shaft and generating a signal dependent on the relative angular displacement, the output and reactive torques being opposite in direction to each other.

The above and further objects, details and advantages of the present invention will become apparent from the following detailed description of preferred embodiments thereof, when taken in conjunction with the accompanying drawings.

DESCRIPTION OF THE PREFERRED EMBODIMENTS

Figure 1:
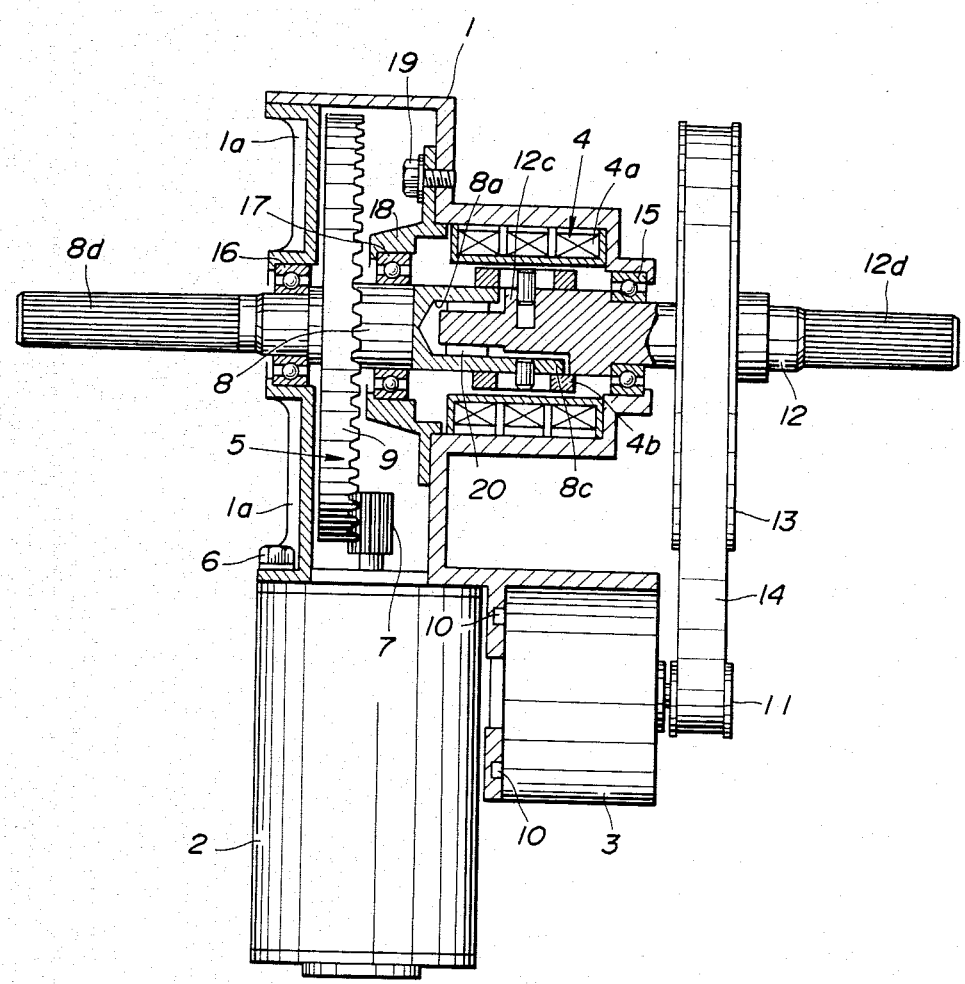
FIG. 1/is a cross-sectional view of the mechanical structure of a motor-driven power booster according to an embodiment of the present invention.

A motor-driven power booster according to the present invention includes a mechanical structure and an electric circuit. The mechanical structure will first be described with reference to FIGS. 1 through 4. The mechanical structure generally comprises a casing 1, an output shaft 8 and an input shaft 12 which project in opposite directions from the casing 1, and a first motor 2 and a second motor 3 which are operatively coupled to the output and input shafts 8, 12, respectively, for cooperation therewith. The casing 1 is fixed to an automobile chassis (not shown). The first motor 2 and the second motor 3 are fixed to the casing 1, which houses therein a relative angle detector 4 and a speed reducer 5.

The input and output shafts 12, 8 are disposed coaxially with each other. As shown in FIG. 1, the output shaft 8 is rotatably supported on the casing 1 by two bearings 16, 17. The bearing 16 is mounted on one side of the casing 1, and the other bearing 17 is disposed in the casing 1 by a bracket 18. The input shaft 12 is rotatably supported on the casing 1 by a bearing 15 disposed on the other side thereof and a bearing 20 mounted in an axial hole 8a defined in the end of the output shaft 8 which faces the input shaft 12.

Figure 2:
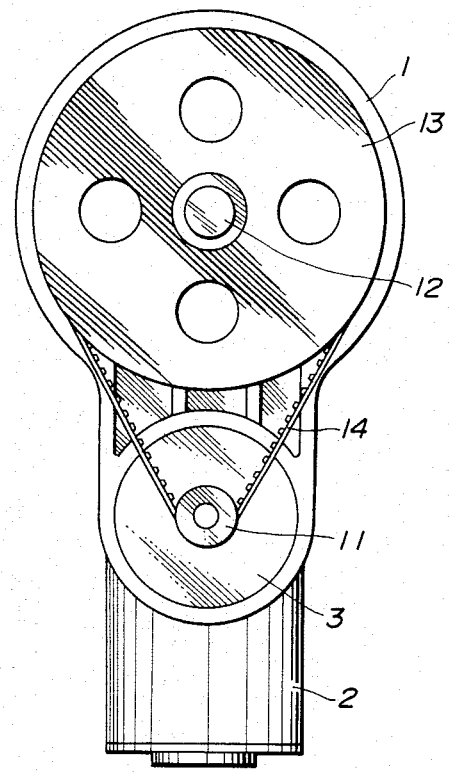
FIG. 2 is a side elevational view of the structure of FIG. 1, as seen from the righthand end thereof.
Figure 4:
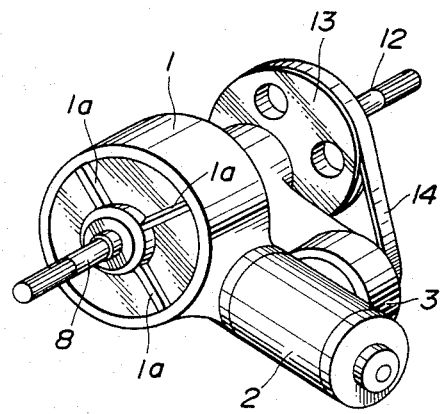
FIG. 4 is a perspective view of the structure shown in FIG. 1.

The first motor 2 is secured to the casing 1 by bolts 6 and includes a drive shaft supporting thereon a pinion gear 7 meshing with a crown gear 9 fixed to the output shaft 8. The pinion gear 7 and the crown gear 9 jointly constitute the speed reducer 5. The second motor 3 is fixed to the casing 1 by flat-head screws 10 and has a drive shaft supporting thereon a smaller-diameter pulley 11. An endless toothed belt 14 is trained around the smaller-diameter pulley 11 and a larger-diameter pulley 13 fixed to the input shaft 12, as illustrated in FIG. 2.

Figure 3:
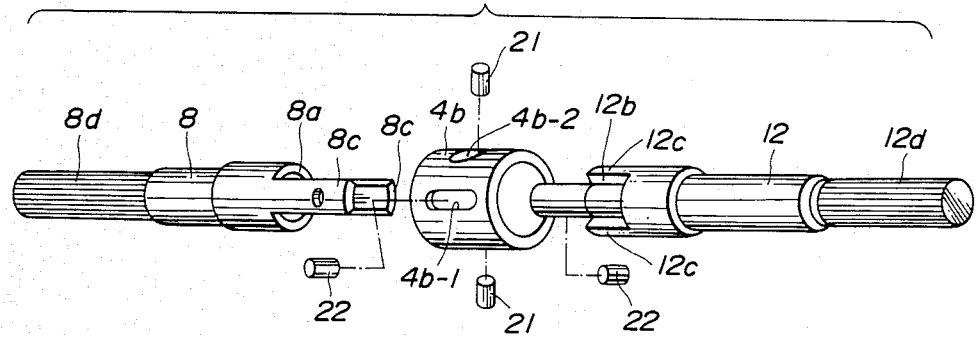
FIG. 3 is an exploded perspective view of an input shaft, an output shaft, and the moving core of a differential transformer in the structure of FIG. 1.

As shown in FIG. 3, the output shaft 8 has a pair of tongues 8c on its end confronting the input shaft 12, and the input shaft 12 has a pair of teeth 12c on its end facing the output shaft 8. With the input and output shafts 12, 8 assembled together, each of the tongues 8c is positioned between the teeth 12c. When the input shaft 12 is rotated with repsect to the output shaft 8 through a considerable angle, the tongues 8c are brought into engagement with the teeth 12c. Normally, however, there are gaps or clearances between the tongues 8c and sides 12b of the teeth 12c. Therefore, the input shaft 12 can rotate with respect to the output shaft 8.

The relative angle detector 4 serves to detect the angle difference between the input and output shafts 12, 8. The relative angle detector 4 includes a differential transformer comprising a coil 4a fixed to an inner surface of the casing 1 and a tubular moving core 4b disposed in the coil 4a and fitted over the input and output shafts 12, 8 where they are coupled. The moving core 4b has a pair of axially elongate slots 4b-1 that are diametrically opposite to each other and a pair of slots 4b-2 that are diametrically opposite to each other and inclined with respect to the axis of the moving core 4b-1, the slots 4b-2 being 90° spaced from the slots 4b-1. Pins 21 fixed to the teeth 12c of the input shaft 12 are loosely fitted in the inclined slots 4b-2, respectively, and pins 22 fixed to the tongues 8c of the output shaft 8 are loosely fitted in the the axial slots 4b-1, respectively. Therefore, when the input shaft 12 is rotated with respect to the output shaft 8 to produce a relative angle therebetween, the moving core 4b is axially displaced in a direction dependent on the direction of the relative angle through an interval proportional to the magnitude of the relative angle. Such a displacement of the moving core 4b is detected by the coil 4a and an electric circuit (described later) coupled to the coil 4a and converted thereby into an electric signal representative of the relative angle.

The casing 1 is reinforced by a plurality of ribs 1a.

Where the power booster shown in FIG. 1 is incorporated in an automotive power steering system, the outer end of the input shaft 12 is coupled through splines 12d to a shaft associated with a steering wheel, and the outer end of the output shaft 8 is coupled through splines 8d to a shaft associated with a rack and pinion mechanism for operating the tie rods of steerable wheels. When the driver turns the steering wheel to produce an angle difference between the input and output shafts 12, 8, the relative angle detector 4 and the associated electric circuit detects the angle difference and generates an electric signal commensurate with the angle difference. The electric circuit then processes the electric signal to produce control signals for controlling the operation of the first and second motors 2, 3. The first motor 2 generates a torque dependent on the angle difference between the input and output shafts 12, 8, and the generated torque is transmitted through the speed reducer 5 to the output shaft 8 for steering the steerable wheels. The second motor 3 generates a torque dependent on the torque imposed on the output shaft 8 and applies the generated torque as a steering reactive force to the input shaft 12. Thus, the output torque is applied to the output shaft 8 by the first motor 2 and the steering reactive torque is applied to the input shaft 12 by the second motor 3.

Figure 5:
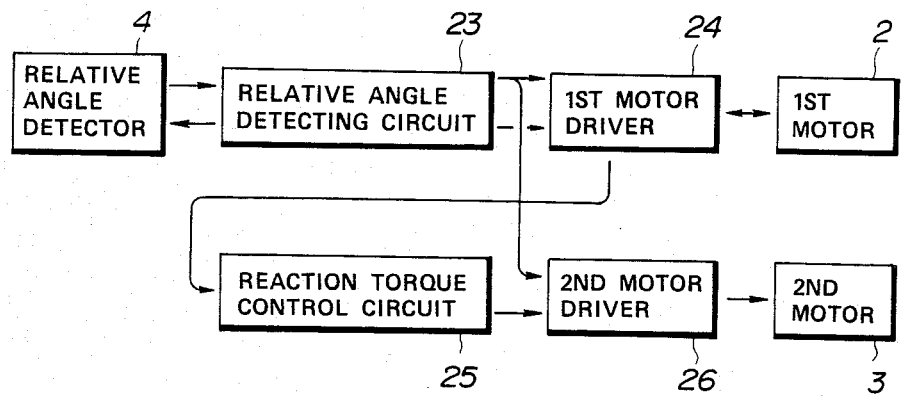
FIG. 5 is a block diagram of an electric circuit of the motor-driven power booster, the view also showing the directions of flow of signals in the electric circuit.

FIG. 5 shows the manner in which signals flow in the electric circuit. A signal generated by the relative angle detector 4 is applied to a relative angle detecting circuit 23 which produces a first torque signal proportional to the relative angle between the input and output shafts 12, 8 for controlling the magnitude of the torque generated by the first motor 2, and a directional signal dependent on the direction of a relative angular displacement of the input shaft 12 with respect to the output shaft 8. These signals are fed to a first motor driver 24 for energizing the first motor 2 to apply a torque to the output shaft 8. In response to an armature current supplied to the first motor 2, a reactive torque control circuit 25 generates a second torque signal for controlling the magnitude of the torque produced by the second motor 3. The second torque signal from the reactive torque control circuit 25 and the directional signal from the relative angle detecting circuit 23 are fed to a second motor driver 26 for energizing the second motor 3 to apply a reactive torque to the input shaft 12.

Figure 6:
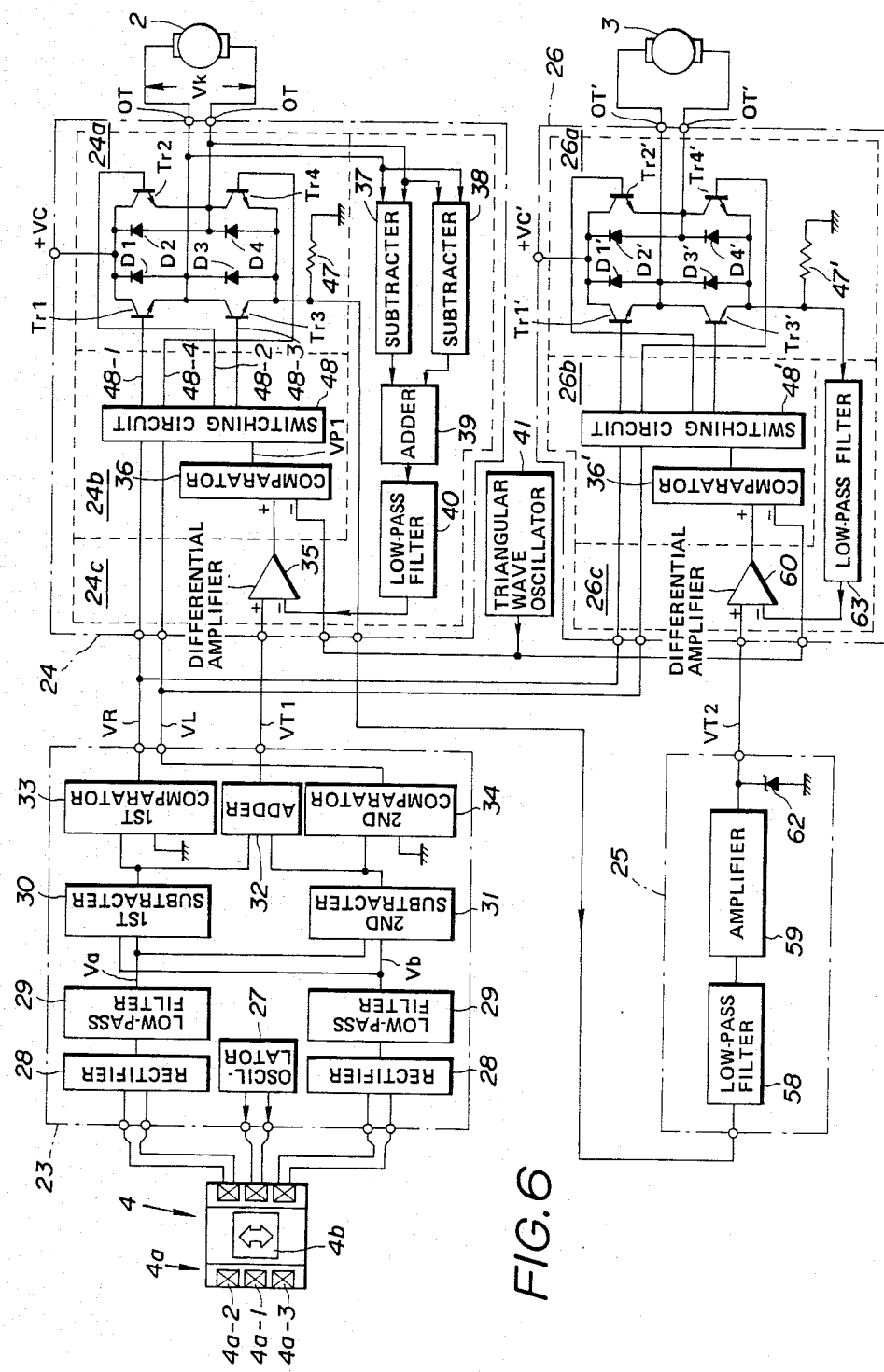
FIG. 6 is a circuit diagram, partly in block form, of the electric circuit shown in FIG. 5.

The electric circuit will be described in greater detail with reference to FIG. 6.

The coil 4a of the differential transformer of the relative angle detector 4 comprises a primary winding 4a-1 and a pair of secondary windings 4a-2, 4a-3 disposed one on each side of the primary winding 4a-1. The primary winding 4a-1 is supplied with an AC voltage of a constant frequency. When the moving core 4b is disposed in the central position in the coil 4a, voltages of equal amplitudes are induced across the secondary windings 4a-2, 4a-3 When the moving core 4b is displaced dependent on the angle difference between the input and output shafts 12, 8, the amplitudes of the voltages induced across the secondary windings 4a-2, 4a-3 are varied. The output currents from the secondary windings 4a-2, 4a-3 are rectified and smoothed by rectifiers 28 and low-pass filters 29, respectively, which are coupled to the corresponding secondary windings. Each of output signals Va, Vb from the low-pass filters 29 is fed to both first and second subtracters 30, 31. The first subtracter 30 generates a signal indicative of Va−Vb, and the second subtracter 31 generates a signal indicative of Vb−Va. By applying suitable biases to elements of the first and second subtracters 30, 31, the output signal from the first subtracter 30 becomes zero when Va<Vb, and the output signal from the second subtracter 31 becomes zero when Va>Vb. Therefore, the output signal from the first subtracter 30 is a signal proportional to the angle difference between the input and output shafts 12, 8 when there is a clockwise (FIG. 2) relative anglular displacement of the input shaft 12 with respect to the output shaft 8. The output signal from the second subtracter 31 is a signal proportional to the angle difference between the input and output shafts 12, 8 when there is a counterclockwise (FIG. 2) relative angular displacement of the input shaft 12 with respect to the output shaft 8.

The output signals from the first and second subtracters 30, 31 are applied to an adder 32 which produces the first torque signal VT1 proportional to the angle difference between the input and output shafts 12, 8. The output signal from the first subtracter 30 is also applied to one input terminal of a first comparator 33 with the other input terminal thereof being grounded. When the output signal of the first subtracter 30 is not zero, i.e., when the input shaft 12 is rotated clockwise with respect to the output shaft 8, an output signal VR of the first comparator 33 is high in level. The output signal from the second subtracter 31 is fed to a second comparator 34 that is identical in construction to the first comparator 33. An output signal VL from the second comparator 34 is high in level when the input shaft 12 is rotated counterclockwise with respect to the output shaft 8. Either one of the output signals VR, VL is low and the other high at all times when the input shaft 12 is rotated with respect to the output shaft 8. The combination of these output signals VR, VL serves as the directional signal.

The first motor driver 24 will be described below. The first motor driver 24 is responsive to the first torque signal VT1 and the directional signal from the relative angle detecting circuit 23 for driving the first motor 2 under chopper control. The first motor driver 24 comprises a power circuit 24a including four NPN-type power transistors Tr1, Tr2, Tr3, Tr4 connected as a bridge, a transistor driver 24b for generating a variable-duration pulse train for chopper control and selectively applying the pulse train to the input terminals (bases) of two out of the four power transistors Tr1, Tr2, Tr3, Tr4, and a negative feedback circuit 24c for feeding a signal indicative of the current supplied to the first motor 2 back to the input terminal of the transistor driver 24b.

The feedback circuit 24c includes a differential amplifier 35 having a positive input terminal supplied with the first torque signal VT1 and a negative input terminal supplied with the feedback signal. The differential amplifier 35 produces an output signal proportional to the difference between these input signals.

The transistor driver 24b comprises a comparator 36 and a transistor switching circuit 48. The comparator 36 has one input terminal coupled to the output terminal of the differential amplifier 35 and the other input terminal coupled to the output terminal of a triangular wave oscillator 41. The comparator 36 generates a high-level signal when the instantaneous value of the input signal from the differential amplifier 35 is higher than the instantaneous value of the input signal from the triangular wave oscillator 41, and a low-level signal otherwise. The comparator 36 therefore produces a pulse train VP1 having a pulse duration dependent on the output level of the differential amplifier 35. The pulse train VP1 and the directional signal are fed to the transistor switching circuit 48. The transistor switching circuit 48 has four output terminals 48-1, 48-2, 48-3, 48-4. Pulse trains corresponding to the input pulse train VP1 are issued from two of the four output terminals 48-1, 48-2, 48-3, 48-4 dependent on the directional signal.

The power circuit 24a has a power supply terminal +VC connected to a positive power supply and a pair of output terminals OT connected to the first motor 2. The power transistor TR1 has a collector connected to the power supply terminal +VC, an emitter connected to the collector of the power transistor Tr3 and one of the output terminals OT, and a base connected to the first output terminal 48-1 of the transistor switching circuit 48. The power transistor Tr2 has a collector connected to the power supply terminal +VC, an emitter connected to the collector of the power transistor Tr4 and the other output terminal OT, and a base connected to the second output terminal 48-2 of the transistor switching circuit 48. The power transistor Tr3 has an emitter connected to a first end of a resistor 47 with the second end grounded and a base connected to the third output terminal 48-3 of the transistor switching circuit 48. The power transistor Tr4 has an emitter connected to the first end of the resistor 47 and a base connected to the fourth output terminal 48-4 of the transistor switching circuit 48. Diodes D1, D2, D3, D4 are connected between the power transistors Tr1, Tr2, Tr3, Tr4, i.e., have anodes and cathodes connected respectively to the collectors and emitters of the power transistors Tr1, Tr2, Tr3, Tr4. The diodes D1, D2, D3, D4 serve to smooth the current flowing through the first motor 2 during chopper control thereof.

The feedback circuit 24c includes a pair of subtracters 37, 38 each having a pair of input terminals joined respectively to the output terminals OT of the power circuit 24a so that a voltage VK across the first motor 2 can be applied between the input terminals of each of the subtracters 37, 38. The feedback circuit 24c also includes an adder 39 having a pair of input terminals coupled to the output terminals, respectively, of the subtracters 37, 38, and a low-pass filter 40 connected between the adder 39 and the differential amplifier 35. The subtracters 37, 38 and the adder 39 are functionally identical to the subtracters 30, 31 and the adder 32 in the relative angle detecting circuit 23.

When the input shaft 12 is rotated clockwise (FIG. 2) by the steering wheel, the output signal VR of the first comparator 33 goes high to supply the bases of the power transistors Tr1, Tr4 with pulse train signals having a pulse duration proportional to the angle difference between the input and output shafts 12, 8. The power transistors Tr1, Tr4 are now energized by the pulse train signals to allow currents to flow periodically between their collectors and emitters dependent on the applied pulse signals. The first motor 2 generates a rotational torque which is applied through the speed reducer 5 to the output shaft 8 to rotate the same clockwise. When the input shaft 12 is rotated counterclockwise (FIG. 2), the output signal VL from the second comparator 34 causes pulse signals to be applied to the bases of the power transistors Tr2, Tr3 which are periodically energized to enable the second first motor 2 to produce a rotational torque to rotate the output shaft 8 counterclockwise. Therefore, the output torque generated by the first motor 2 is controlled by the relative angular displacement between the input and output shafts 12, 8.

The reactive torque control circuit 25 will hereinafter be described. The reactive torque control circuit 25 comprises a low-pass filter 58, an amplifier 59 with its input terminal connected to the output terminal of the low-pass filter 58, and a zener diode 62 having a cathode coupled to the output terminal of the amplifier 59 and an anode connected to ground. The low-pass filter 58 has an input terminal coupled to the first end of the resistor 47 in the power circuit 24a of the first motor driver 24. A voltage across the resistor 47 is governed by the armature current of the first motor 2. Since the armature current is a pulsating current, the voltage across the resistor 47 is smoothed by the low-pass filter 58. The smoothed voltage is amplified by the amplifier 59. The output voltage of the amplifier 59 is prevented by the zener diode 62 from exceeding a prescribed voltage level. Therefore, the output signal from the amplifier 59 via the zener diode 62 is proportional to the torque generated by the first motor 2 within a certain range, and is applied as the second torque signal VT2 to the second motor driver 26.

The second motor driver 26 will be described below. The second motor driver 26 is responsive to the directional signal from the relative angle detecting circuit 23 and the second torque signal VT2 from the reactive torque control circuit 25 for energizing the second motor 3 under chopper control. The second motor driver 26 comprises a power circuit 26a, a transistor driver 26b, and a feedback circuit 26c. The power circuit 26a and the transistor driver 26b are structurally identical to those of the first motor driver 24, and will not be described in detail. The components of the power circuit 26a and the transistor driver 26b are denoted by the same reference characters, with a prime, used to identify the corresponding components of the first motor driver 24. The feedback circuit 26c includes a low-pass filter 63 with its input terminal connected to the first end of the resistor 47' and a differential amplifier 60 having a negative input terminal connected to the output terminal of the low-pass filter 63. The differential amplifier 60 has a positive input terminal connected to the cathode of the zener diode 62 for being supplied with the second torque signal VT2, and an output terminal joined to the positive input terminal of the comparator 36' of the transistor driver 26b. The feedback circuit 26c functions as a negative feedback circuit.

When the input shaft 12 is rotated clockwise by the steering wheel, the output signal VR goes high to supply the bases of the power transistors Tr2', Tr3' with pulse train signals having a pulse duration dependent on the second torque signal VT2. The power transistors Tr2', Tr3' are now energized by the pulse train signals to allow pulsed currents to flow between their collectors and emitters dependent on the applied pulse signals. The second motor 3 generates a counterclockwise rotational torque which is applied as a reactive torque through the belt 14 to the input shaft 12 to rotate the same counterclockwise. The torque imposed on the input shaft 12 is proportional to the output torque applied by the first motor 2 to the output shaft 8 until this output torque reaches a prescribed level. To prevent the reactive torque from being excessively increased, the second torque signal VT2 is prevented by the zener diode 62 from exceeding a certain level. When the input shaft 12 is rotated counterclockwise, the signal VL goes high to allow pulse currents to flow between the collectors and emitters of the power transistors Tr1', Tr2'. Therefore, the second motor 3 generates a clockwise torque for imposing a clockwise reactive torque to the input shaft 12.

Figure 7:
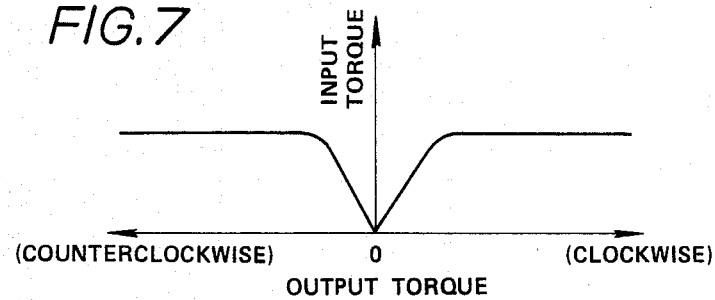
FIG. 7 is a graph showing the relationship between the output torque and the reactive torque of the power booster.

The relationship between the output torque and the input torque is illustrated in FIG. 7, in which the horizontal axis indicates the magnitude of the output torque and the vertical axis the magnitude of the input torque (equal to the magnitude of the reactive torque). The reactive torque applied by the second motor 3 to the input shaft 12 is proportional to the output torque while the output torque is within a certain range above zero, and is kept at a substantially constant level after the output torque exceeds the certain range.

With the above construction of the motor-driven power booster, the input and output shafts 12, 8 are mechanically uncoupled, and the torque is applied by the first motor 2 to the output shaft 8 dependent on the relative angular displacement of the input shaft 12 with respect to the output shaft 8, whereas the second motor 3 is energized on the basis of the output torque from the first motor 2 to apply a reactive torque to the input shaft 12, the reactive torque being proportional to the output torque within the certain range. When the input shaft 12 is released of the applied torque, the input shaft 12 is rotated back by the torque of the second motor 3 until the armature current thereof falls to zero.

Figure 8:
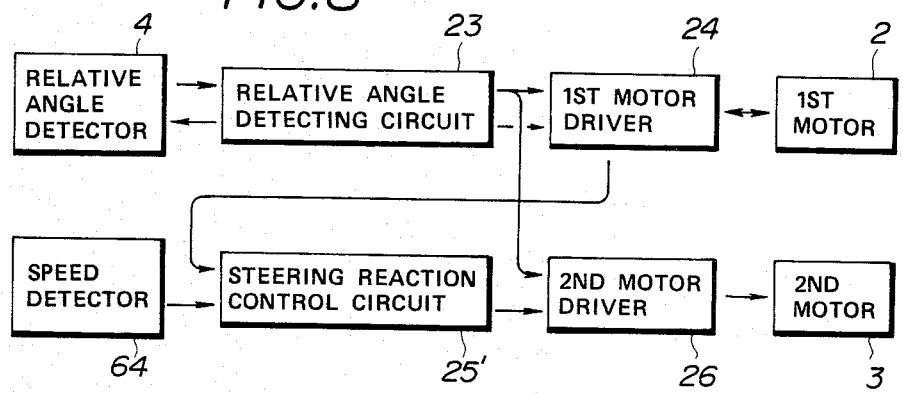
FIG. 8 is a block diagram of a modified electric circuit of the motor-driven power booster, the view also showing the directions of flow of signals in the electric circuit.

A modified electric circuit will be described with reference to FIGS. 8, 9, and 10(A) through 10(C). The mechanical structure for use with such a modified electric circuit is the same as that shown in FIGS. 1 through 4. As illustrated in FIG. 8, the reactive torque control circuit 25 (FIG. 5) is replaced with a steering reaction control circuit 25' and a car speed detector 64 is connected to the steering reaction control circuit 25', with the other electric circuitry remaining unchanged. Therefore, only the steering reaction control circuit 25' and the car speed detector 64 will be described below.

It should be noted that the power booster incorporating the modified electric circuit is designed for use in an automotive power steering system. The term "reactive torque" used above will hereinafter be referred to as "steering reaction".

Figure 9:
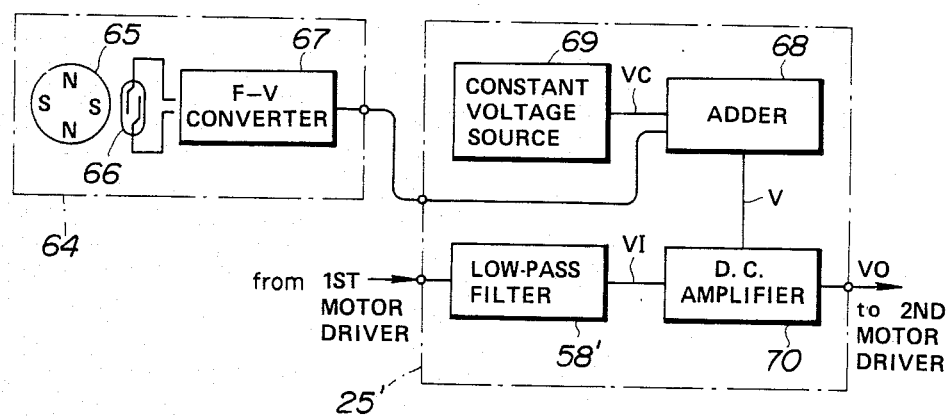
FIG. 9 is a block diagram of a circuit for determining a steering reactive force and a car speed detector in the electric circuit of FIG. 8, the car speed detector being schematically illustrated.

FIG. 9 shows the steering reaction control circuit 25' and the car speed detector 64 in detail. The car speed detector 64 comprises a rotary magnet 65 rotatable at r.p.m. commensurate with the speed of the automobile on which the power booster is mounted, a reed switch 66 disposed in the vicinity of the rotary magnet 65, and a frequency-to-voltage (F-V) converter 67 connected to the reed switch 66. The reed switch 66 is cyclically opened and closed at a frequency dependent on the r.p.m. of the rotary magnet 65. Each time the reed switch 66 goes through one cycle of its opening and closing operation, the F-V converter 67 generates one pulsed signal therein. The F-V converter 67 issues a DC voltage proportional to the frequency of the pulsed signals generated therein, i.e., proportional to the car speed, and applies the DC voltage to the steering reaction control circuit 25'.

The steering reaction control circuit 25' comprises an adder 68, a constant voltage source 69, a DC amplifier 70, and a low-pass filter 58'. The output voltage from the F-V converter 67 is applied to the adder 68, by which a constant voltage VC from the constant voltage source 69 is added to the output voltage of the F-V converter 67. The adder 68 applies its output voltage V (shown in FIG. 10(C)) which is expressed as V=VC+ClS where Cl is a positive constant and S is the car speed. The output voltage V from the adder 68 is supplied as a power supply voltage to the DC amplifier 70. The voltage at the first end of the resistor 47 in the power circuit 24a of the first motor driver 24 is smoothed by the low-pass filter 58', and the smoothed voltage VI is applied to the DC amplifier 70. The DC amplifier 70 applies an output voltage V0 to the second motor driver 26.

Figure 10:
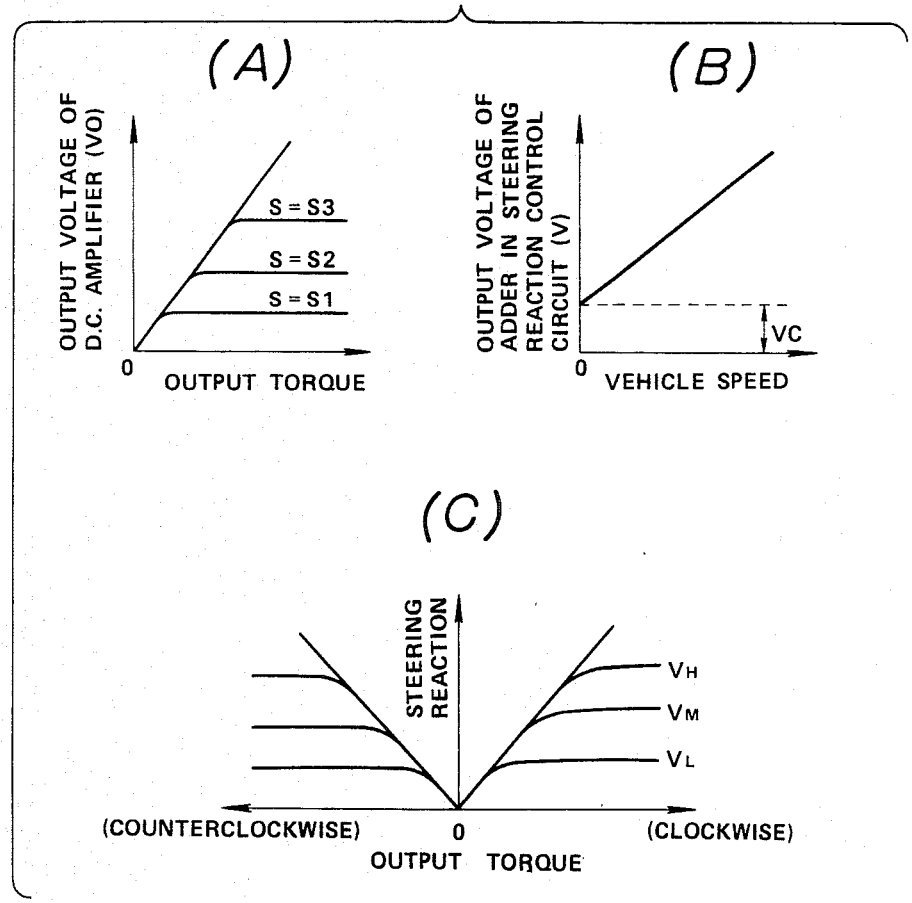
FIGS. 10(A) through 10(C) are graphs showing the relationship between parameters in the modified electric circuit.

The input signal VI applied to the DC amplifier 70 is proportional to the torque generated by the first motor 2, and the output voltage V0 from the DC amplifier 70 serves to determine the steering reaction to be applied by the second motor 3 to the input shaft 12. Insofar as the DC amplifier 70 operates in its nonsaturated range, the output voltage V0 thereof is approximately proportional to the input voltage VI. When the car speed is low, the power supply voltage for the DC amplifier 70 is low, and hence the DC amplifier 70 is saturated even if the input voltage VI is of a relatively low value (low level). The output voltage V0 is therefore of a relatively low, substantially constant value in the range in which the input voltage VI is higher than the low level. When the car speed is high, the power supply voltage for the DC amplifier 70 is high, and the DC amplifier 70 is saturated only when the input voltage VI is in a range higher than a relatively high value (high level). FIG. 10(A) shows the relationship between the output torque and the output voltage VO of the DC amplifier 70 for car speeds S1, S2, S3 (S1<S2<S3). The output torque and the absolute value of the steering reaction are related as shown in FIG. 10(C) such that when the output torque is of a relatively large value, the steering reaction produced by the second motor 3 becomes larger as the car speed goes higher. Therefore, the driver feels greater resistance to rotation of the steering wheel. FIG. 10(C) shows characteristic curves VL, VM, VH for low, medium, and high car speeds, respectively.

The torque that can be imposed by the second motor 3 to the input shaft 12 can freely be selected by further modifying the steering reaction control circuit.

With the arrangement of the present invention, the input and output shafts are mechanically uncoupled, and the large torque is applied by the first motor to the output shaft based on the angle difference between the input and output shafts, whereas the reactive torque is imposed by the second motor to the input shaft. Therefore, any variation in the torque on the output shaft, arising from disturbances, is not transmitted to the input shaft. Where the power booster of the invention is employed in a motor-driven power steering system, it can give the driver a good steering feel. The reactive torque applied to the input shaft can appropriately be adjusted by controlling the output power of the second motor, so that a suitable reactive torque can easily be selected.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motor-driven power booster comprising:
   a casing;
   input and output shafts rotatably supported on said casing;
   a first motor for driving said output shaft;
   a second motor for driving said input shaft;
   detecting means operatively cooperating with said input and output shafts for generating an output signal dependent on angular positions of said input and output shafts; and
   electric circuit means for supplying electric power to said first motor to apply an output torque to said output shaft in response to the output signal from said detecting means and for supplying electric power to said second motor to apply a reactive torque to said input shaft in response to the electric power supplied to said first motor.

2. A motor-driven power booster according to claim 1, wherein said input and output shafts are arranged coaxially with each other, said detecting means including means for detecting the relative angular displacement of said input shaft with respect to said output shaft and for generating a signal dependent on said relative angular, displacement, said output torque and said reactive torque being opposite in direction to each other.

3. A motor-driven power booster according to claim 2, wherein said detecting means comprises a differential transformer interposed between said input and output shafts, and a relative angle detector cooperating with said differential transformer for generating a signal indicative of the magnitude of said relative angular displacement and a signal indicative of the direction of said relative angular displacement.

4. A motor-driven power booster according to claim 3, wherein said electric circuit means comprises a first motor driver for driving said first motor, a second motor driver for driving said second motor, and a circuit connected to said first and second drivers for determining a steering reactive force, said circuit being responsive to a signal supplied from said first motor driver and representative of the electric power supplied to said first motor for generating a signal to control said second motor driver.

5. A motor-driven power booster according to claim 4, wherein said steering reactive force determining circuit comprises an amplifier receiving a driving signal from said first motor driver and a zener diode for limiting an output signal from said amplifier to a constant value, said steering reactive force determining circuit being arranged such that it can produce an ouput signal substantially proportional to said output torque applied to said output shaft when said output torque applied to said output shaft is in a range up to a prescribed value and can produce a substantially constant output signal when said output torque applied to said output shaft is in a range exceeding said prescribed value.

6. A motor-driven power booster according to claim 4, wherein said steering reactive force determining circuit includes an amplifier receiving a driving signal from said first motor driver, and a speed detecting means operably associated with said amplifier for detecting the speed of a vehicle and for limiting an output signal from said amplifier to a value dependent on the speed of the vehicle.

7. A motor-driven power booster comprising:
   a casing;
   input and output shafts rotatably supported on said casing;
   a first motor for driving said output shaft;
   a second motor for driving said input shaft;
   detecting means operatively cooperating with said input and output shafts for generating an output signal dependent on relative angular displacements of said input and output shafts; and
   electric circuit means for supplying electric power to said first motor to apply an output torque to said output shaft in response to the output signal from said detecting means and for supplying electric power to said second motor to apply a reactive torque to said input shaft in response to the electric power supplied to said first motor, said reactive torque being proportional to said output torque within a predetermined range.

* * * * *